United States Patent
Grummert et al.

(10) Patent No.: US 6,983,504 B2
(45) Date of Patent: Jan. 10, 2006

(54) METHOD FOR CARRYING OUT AN INTEGRITY TEST FOR FILTER ELEMENTS

(75) Inventors: Ulrich Grummert, Bad Soden-Allendorf (DE); Ina Pahl, Hannover (DE)

(73) Assignee: Sartorius AG, Goettingen (DE)

( * ) Notice: Subject to any disclaimer, the term of this patent is extended or adjusted under 35 U.S.C. 154(b) by 407 days.

(21) Appl. No.: 10/676,255

(22) Filed: Oct. 2, 2003

(65) Prior Publication Data

US 2004/0129060 A1 Jul. 8, 2004

Related U.S. Application Data

(63) Continuation of application No. PCT/EP02/03386, filed on Mar. 26, 2002.

(30) Foreign Application Priority Data

Apr. 2, 2001 (DE) .......................................... 101 16 335

(51) Int. Cl.
*G01N 15/08* (2006.01)

(52) U.S. Cl. ............................................................ 7/38
(58) Field of Classification Search ...................... 73/38
See application file for complete search history.

(56) References Cited

U.S. PATENT DOCUMENTS

| | | | | |
|---|---|---|---|---|
| 5,282,380 A | * | 2/1994 | DiLeo et al. .................. 73/38 |
| 5,353,630 A | * | 10/1994 | Soda et al. ...................... 73/38 |
| 5,361,625 A | * | 11/1994 | Ylvisaker ........................ 73/38 |
| 5,417,101 A | * | 5/1995 | Weich ............................. 73/38 |
| 5,581,017 A | * | 12/1996 | Bejtlich, III ................... 73/38 |
| 5,591,898 A | * | 1/1997 | Mayer ............................. 73/38 |
| 5,594,161 A | * | 1/1997 | Randhahn et al. ............. 73/38 |
| 6,568,282 B1 | * | 5/2003 | Ganzi ............................. 73/38 |
| 6,640,615 B1 | * | 11/2003 | Morrow .......................... 73/38 |

FOREIGN PATENT DOCUMENTS

| | | |
|---|---|---|
| DE | 4209519 | 9/1993 |
| DE | 4119040 | 1/1997 |
| DE | 19918419 | 10/2000 |
| EP | 0582822 | 2/1994 |
| EP | 0592066 | 4/1994 |
| JP | 4142445 | 5/1992 |

* cited by examiner

*Primary Examiner*—Michael Cygan
(74) *Attorney, Agent, or Firm*—Crowell & Moring LLP

(57) ABSTRACT

A method for testing the integrity of filter elements, in which the convective component of the volumetric gas flow rate is determined from the ratio of the volumetric gas flow rates and the ratio of the solubility or diffusion coefficients of two different gases in the wetting liquid of the filter elements or is determined from the ratio of the volumetric gas flow rates and the ratio of the solubility or diffusion coefficients of a test gas in two different wetting liquids.

21 Claims, 3 Drawing Sheets

METHOD FOR CARRYING OUT AN INTEGRITY TEST FOR FILTER ELEMENTS

CROSS REFERENCE TO RELATED APPLICATIONS

This application is a continuation of international patent application no. PCT/EP02/03386, filed Mar. 26, 2002, designating the United States of America, and published in German as WO 02/078823, the entire disclosure of which is incorporated herein by reference. Priority is claimed based on Federal Republic of Germany patent application no. DE 101 16,335.5, filed Apr. 2, 2001.

BACKGROUND OF THE INVENTION

The present invention relates to a method for testing the integrity of filter elements.

Filtration systems, particularly those for sterile filtration, are tested for their integrity prior to and after filtration to ensure filtration reliability and product safety. This includes a diffusion test, a pressure retention test and a bubble point test, which are also approved for use in pharmaceutical applications, with special safety requirements regarding sterile filtration. These tests correlate to destructive load tests, the so-called bacteria challenge tests, in which standard test bacteria are used to determine the degree of sterile filtration by standardized test methods (ASTM 838-83).

The diffusion test measures the transmembrane diffusive flow of a gas (Fick's first law) through a wetted filter material, e.g., a membrane, established after the filter material is pressurized on one side with a test gas under a test pressure. To conduct the test, a filter element e.g., a membrane filter cartridge, which is wetted with a liquid, e.g., water, alcohol or a product fluid, is pressurized with a test gas under a test pressure, typically air or nitrogen. Various methods are used to measure the gas diffusion, e.g., measuring the gas volume on the clean side (filtrate side) or the amount of gas that needs to be delivered on the inflow side (retentate side) to maintain the test pressure, or determining the pressure increase on the clean side or the pressure drop on the inflow side after switching off the pressure gas source (pressure retention test).

In small-area systems the volumetric gas flow rate caused by genuine defects in the filter materials can be clearly detected based on its order of magnitude. This is no longer possible, however, in large area systems with many filter elements connected in parallel or with large filter cartridges that currently have filter areas of up to 90 m². This is due to the fact that, when the test is conducted, no distinction can be made between the gas flow component produced by diffusion and the component based on convection caused by minor but harmful defects. Particularly in large filter areas, the diffusion component thus frequently overlaps the convection component, so that the measured total gas flow makes it appear as if the filter elements were intact.

Jornitz, published German Patent Application No. DE 199 18 419 describes a method for testing the integrity of filter elements using a combination of the diffusion test and the bubble point test. With this combination, a statement is to be made regarding the integrity of the filter elements, if the gas flow caused by diffusion does not exceed the maximum allowable value of the gas flow at the corresponding test pressure.

Weich, U.S. Pat. No. 5,417,101 (=DE 41 19 040) discloses a method and apparatus for testing the operational state of filter elements. The filter elements are present in a filter system that has a plurality of parallel filter elements, which in turn are divided into a plurality of blockable sections. According to the method proposed by U.S. Pat No. 5,417,101, the full gas flow rate of a test gas under a test pressure through the wetted filter material is measured collectively for all filter elements. Thereafter it is determined whether the measured flow rate differs from a first desired flow rate by an amount that falls within a first predefined range. The desired flow rate corresponds to the situation where the filters are intact. Any deviation that falls within the predefined range is said to indicate that all filter elements are intact. This method has the drawback that the desired inference is not unambiguous since, in such a case, defective filter elements may be present in the filter housing but their unacceptable increased gas flow cannot be detected by the collective measurement of the total flow rate.

If, however, the measured total flow rate exceeds the first desired flow rate by an amount that is greater than the amount allowed by the first predefined range, this should mean that at least one filter element is not intact. In this case, the passage of the gas through at least one segment is blocked and the total gas flow rate through the wetted filter material of the remaining filter elements is measured. Now it is determined whether this measured flow rate differs from a second desired flow rate that corresponds to the resulting reduced number of filter elements by an amount that falls within a second predefined range. A deviation in the second predefined range should indicate that one or more filter elements in the blocked segment is/are not intact.

This procedure again has the drawback that this inference, too, is not unambiguous, since in such a case defective filter elements may be present in the non-blocked segments but their unacceptably increased gas flow rate cannot be detected by the collective measurement of the flow rate. Thus, the method proposed by U.S. Pat. No. 5,417,101 does not produce unambiguous results with respect to the integrity of the filter elements.

In summary it may therefore be said, especially when filter systems with a plurality or many filter elements are tested using the methods of the prior art, that in case of doubt, each filter element must be individually tested for its integrity.

SUMMARY OF THE INVENTION

Thus, the object of the present invention was to provide an improved method for testing the integrity of filter elements.

Another object of the invention was to provide a method for testing the integrity of filter elements which makes it possible to distinguish between the gas flow caused by diffusion through a wetted filter material and the convective gas flow caused by excessively large pores or defects in the filter material.

A further object of the invention was to provide an unambiguous method for testing the integrity of filter elements even if these filter elements have a large filter area.

These and other objects have been achieved in accordance with the present invention by providing a filter element integrity test method as described and claimed hereinafter.

In particular, two method variants are provided for testing the integrity of one or more filter elements that are arranged in a device.

A variant using two different test gases and a single wetting liquid comprises the following steps:

(a) filling the pores of the filter material of the one or more filter elements in the device with the wetting liquid, (b) purging at least the retentate side of the one or more filter elements in the device with a first test gas, (c) pressurizing the one or more filter elements with the first test gas under a test pressure at a test temperature, (d) measuring the volumetric flow rate of the first test gas through the one or more filter elements at the test pressure, (e) degassing the device (i.e., making it pressureless), (f) repeating steps (b) to (d) with a second test gas.

(g) determining the ratio of the volumetric gas flow rates.

(h) determining the ratio of the solubility and diffusion coefficients of the test gases in the wetting liquid at the test temperature, and (i) determining the convective component of the volumetric gas flow rate, in which the ratio of the solubility and diffusion coefficients of the first and the second test gas in the wetting liquid at the test temperature is at least 1.25:1 and the viscosities of the gases at the test temperature do not differ by more than 50%.

A variant using a single test gas and two different wetting liquids comprises the following steps:

(a) filling the pores of the filter material of the one or more filter elements in the device with a first wetting liquid, (b) purging at least the retentate side of the one or more filter elements in the device with the test gas, (c) pressurizing the one or more filter elements with the test gas under a test pressure at a test temperature, (d) measuring the volumetric flow rate of the test gas through the one or more filter elements at the test pressure, (e) degassing the device (i.e., making it pressureless), (f) exchanging the first wetting liquid in the pores of the filter material of the one or more filter elements in the device against a second wetting liquid, (g) repeating steps (b) to (e) with a second wetting liquid, (h) determining the ratio of the volumetric gas flow rates, (i) determining the ratio of the solubility and diffusion coefficients of the test gas in the wetting liquids at the test temperature, and (j) determining the convective component of the volumetric gas flow rate, in which the ratio of the solubility and diffusion coefficients of the test gas in the first and second wetting liquid at the test temperature is at least 1.25:1.

The methods of the invention are based on the finding that two physical processes, diffusion and convection, are involved in the flow of a gas through a wetted filter membrane. The methods can be used analogously in combination as well. In any event, at least two measurements are taken with different solubility and diffusion coefficients of the test gas(es) in the wetting liquid(s).

Diffusion is described by Fick's first law and is a function of the area, the diffusion coefficient of the gas in the wetting liquid, the concentration of the gas in the liquid on the concentrate side (retentate side) of the membrane, the concentration of the gas in the liquid on the filtrate side of the membrane, the thickness of the membrane or the liquid-filled layer, and time. The quantities (effective) area and thickness of the liquid film cannot be measured or calculated exactly because they depend on membrane parameters, such as thickness and pore volume.

Convection or flow through large pores and/or defects in filtration membranes can be approximately described by the law of Hagen-Poiseuille. According to this law, convection depends, among other things, on pressure, temperature, the diameter of the cylindrical pores, and the viscosity of the gas.

The exact calculation and evaluation of convection in membranes is problematic because the pores or defects are not ideal, cylindrical tubes as the law of Hagen-Poiseuille postulates. To evaluate the volumetric gas flow rate caused by diffusion and/or convection in a membrane to be tested at a given pressure, a given temperature and with a given test gas to determine the integrity of the membrane, one has to take into account that a plurality of pores or defects of very different size may be present in the membrane. As a result, a distinction between many small defects or one large defect can be made only to a limited extent by selecting a suitable test pressure or by using several test pressures.

However, diffusion and convection cannot be distinguished directly in terms of their value when measuring the volumetric gas flow rate through the membrane at a given pressure. Yet, to make a statement regarding the integrity or lack of integrity of a membrane to be tested, the portion of the volumetric gas flow rate that is caused by convection due to large pores or defects is decisive. With the above-defined method, a convection component possibly present in the volumetric gas flow rate can be detected.

From the above considerations regarding the convection and diffusion components of the volumetric gas flow rate through a membrane, it follows that the limit values for the maximum allowable volumetric gas flow rate through an intact (new) filter element being considered must always be relatively far above the volumetric gas flow rates to be expected during use to allow a margin for fluctuations that are due to practically unmeasurable parameters. This means that for small area filter elements, a small convection component of the entire volumetric gas flow rate is already sufficient to indicate lack of integrity at the given test pressure and for the given filter area by measuring the volumetric flow rate of a single gas.

In contrast, in the case of large area membrane filters, a large convection component of the volumetric gas flow rate is required to detect any lack of integrity by measuring the volumetric flow rate of a single gas at a given test pressure and for a given filter area.

This can be illustrated by the following considerations: If, in a filter element with a total membrane area of 0.5 $m^2$, a volumetric gas flow rate of 10 ml/min under specific conditions is defined as the limit that indicates that the filter element is intact and this value has been validated accordingly, such a filter element, when actually tested, can quite possibly have a value of, for example, only 6 ml/min. However, if a filtration system is equipped with 20 such filter elements, the fluctuation range resulting in the above example increases theoretically from 4 ml/min to 80 ml/min. For the reasons described above, it is now no longer possible to determine, without testing each individual filter element, whether e.g., a measured value of 180 ml/min is uniformly distributed over the 20 filter elements at 9 ml/min per filter element or whether, e.g., one filter element with a volumetric gas flow rate of 60 ml/min has large defects while the remaining 19 filter elements are intact and have a volumetric gas flow rate of approximately 6 ml/min that is based exclusively on diffusion processes.

In the method according to the invention, the volumetric flow rates of two different test gases are therefore measured in one wetting liquid or the volumetric gas flow rates of one test gas are measured in two different wetting liquids. When the volumetric flow rates through one and the same filter element are measured to determine the filter element's integrity, all the parameters, such as effective area, thickness of the liquid film, test pressure, etc., are equal. On the other hand, the gases and wetting liquids to be used in the methods according to the invention differ as follows with respect to their material constants relevant to diffusion and convection.

The quantity relevant for diffusion is the diffusion coefficient of the test gas in the wetting liquid. However, in the pairs of test gases and wetting liquids to be used, the diffusion coefficient differs by a large factor because of the different solubilities of the gas(es) in the wetting liquid(s). Because all the other conditions are equal during the measurements, the ratio of the solubility coefficients equals that of the diffusion coefficients. These ratios can thus be used synonymously. In contrast to the diffusion coefficients, the viscosity, which is relevant to convection, is equal when one test gas and two wetting liquids are used and almost identical when two test gases and one wetting liquid are used. In other words, the difference in the viscosities, by comparison with the solubility and diffusion coefficients, is negligible.

A preferred pair of test gases for use according to the invention is, for example. $CO_2$ and air. For these gases (at 18° C.) the ratio of the solubility coefficient of $CO_2$ in water to that of air in water is approximately 41:1 (cf. D'Ains—Lax, Taschenbuch für Chemiker and Physiker., Volume III. 4th edition, Springer Verlag, Berlin, 1998, p. 1271.) In contrast, the viscosity of air (0.018 mPa·s, at 18° C.) differs very little from the viscosity of $CO_2$ (0.015 mPa·s, likewise at 18° C.) (viscosity values from the Handbook of Chemistry and Physics, 57th edition, CRC Press, Inc., Cleveland, Ohio, USA, 1976, p. F58). Thus, when the volumetric gas flow rates are measured, the convective component is nearly identical, while the diffusive component, in the case of $CO_2$ relative to air, is increased by a factor of approximately 41.

A preferred pair of wetting liquids or test liquids for use according to the invention is, for example, water and ethanol. The viscosity of water at 20° C. is 1.002 mPa·s and that of ethanol at 20° C. is 1.200 mPa·s (see Handbook of Chemistry and Physics, 5th edition, CRC Press, Inc., Cleveland, Ohio, USA, 1974–1975, pp. F49 and F52).

The other relevant test conditions, such as pressure, temperature, etc. can be kept the same without much effort for both measurements.

Thus, according to a preferred embodiment of the present invention, the above-defined step (i) or (j) of the method using two test gases and one wetting liquid or one test gas and two wetting liquids comprises the calculation of the volumetric gas flow rate through the filter element(s) based on convection.

Based on the comparative measurement of the volumetric gas flow rates and the subsequent simple mathematical operation, the diffusive component of the volumetric gas flow rate in the integrity measurement can be eliminated by calculation from the values that are determined to assess the integrity in order to obtain the convective component of the volumetric gas flow rate:

$$V_A = V_{Kon,A} + V_{Diff,A} \quad \text{(I)}$$

$$V_B = V_{Kon,B} + V_{Diff,B} \quad \text{(II)}$$

Because of the negligible viscosity differences, the following holds for the convective component of the volumetric gas flow rate:

$$V_{Kon,A} = V_{Kon,B} = V_{Kon} \quad \text{(III)}$$

The diffusive component of the volumetric flow rate in the case of test gas A or in the wetting liquid A differs from that of test gas B or in wetting liquid B by the ratio (F) of the diffusion coefficients of the two test gases in the one wetting liquid or of the one test gas in the two different wetting liquids.

$$V_{Diff,A} = V_{Diff,B} \cdot F \quad \text{(IV)}$$

Therefore:

$$V_A = V_{Kon} + V_{Diff,B} \cdot F \quad \text{(V)}$$

$$V_B = V_{Kon} + V_{Diff,B} \quad \text{(VI)}$$

For the convective component of the volumetric gas flow rate this yields:

$$V_{Kon} = V_B - (V_A - V_B)/(F-1) \quad \text{(VII)}$$

where:

$V_A$ is the measured volumetric gas flow rate when using the test gas A in the single wetting liquid or when using the single test gas in the wetting liquid A $V_B$ is the measured volumetric gas flow rate when using the test gas B in the single wetting liquid or when using the single test gas in the wetting liquid B $V_{Diff,A}$ is the diffusive component of the volumetric gas flow rate when using the test gas A in the single wetting liquid or when using the single test gas in the wetting liquid A $V_{Diff,B}$ is the diffusive component of the volumetric gas flow rate when using the test gas B in the single wetting liquid or when using the single test gas in the wetting liquid B $V_{Kon}$ on is the convective component of the volumetric gas flow rate (independent of the test gas or the wetting liquid)

F is the factor, i.e., the ratio of the diffusion coefficient of test gas A to the diffusion coefficient of test gas B when using a single wetting liquid or the diffusion coefficient of the single test gas in the wetting liquid A to the diffusion coefficient of the single test gas in the wetting liquid B.

The actual ratio of the diffusion coefficients and solubility coefficients is preferably determined experimentally since, for example, in the case of the gas pair $CO_2$/air, other quantities, such as the reaction equilibriums

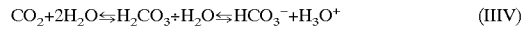
$$CO_2 + 2H_2O \rightleftharpoons H_2CO_3 + H_2O \rightleftharpoons HCO_3^- + H_3O^+ \quad \text{(IIIV)}$$

also play a role in this value.

According to another preferred embodiment of the present invention, the ratio of the solubility or diffusion coefficients of the pairs of test gases and wetting liquids is advantageously determined in such a way that, in the case of a filtration system or device to be tested which has a plurality of like filter units, the volumetric flow rates of the first and the second gas when using a single wetting liquid or of the single gas when using two wetting liquids is measured in a single one of these filter elements which is known not to cause any convective gas flow as a result of defects or excessively large pores.

With the method according to the invention it is not absolutely necessary to calculate the convective component of the volumetric gas flow rate explicitly or approximately. Step (i) or d) of the method according to the invention therefore preferably comprises the comparing of the ratio of the volumetric gas flow rates with the ratio of the solubility or diffusion coefficients of the pairs of test gases and wetting liquids.

The maximum convective component of the volumetric gas flow rate allowable with respect to the integrity of the filter element(s) being tested depends on the field of use of the filter element(s) and is therefore preferably determined by an appropriate process validation to be conducted by the user.

Thus according to yet another preferred embodiment, a maximum allowable convective component of the volumetric gas flow rate that shows that the filter element(s) is/are intact, is determined by correlation to an independent retention test. Preferred retention tests for use according to the invention include, for example, protein retention tests, virus retention tests and bacteria challenge tests.

For example, the maximum allowable convective component of the volumetric gas flow rate in a filter system, which is used in ultrafiltration with a retention of proteins of, e.g., >99.99%, must be set clearly lower than in a filter system with a protein retention of, e.g., only 50%. A further example which may be cited is sterile filtration. By definition, a sterile filter must meet the requirement that, when subjected to $10^7$ bacteria/$cm^2$ of membrane area, it is impermeable to the bacteria. In this case, the maximum allowable convective component of the volumetric gas flow rate can thus be determined by correlation to a bacteria challenge test. Of course, the maximum value of the convective component of the volumetric gas flow rate defined by such a correlation depends on the test pressure used.

Preferably, steps (c) and (d) for the different pairs of test gases and wetting liquids are carried out at several test pressures. This preferred embodiment of the method according to the invention has the advantage that the use of several different test pressures significantly enhances the differentiation between a plurality of small defects or a few large defects, because this eliminates the superimposed diffusive component in the measurement of the volumetric gas flow rates.

The foregoing procedure will now be explained with reference to a calculation example based on the method using two different test gases and one wetting liquid. The same applies, analogously, to the method using one test gas and two different wetting liquids.

A filtration device with 10 identical filter elements to be tested simultaneously is assumed. The separately determined limit value of the volumetric gas flow rate with air in an intact filter element is <10 ml/min. In the first case, all 10 elements should be intact and should each have a volumetric airflow of 6 ml/min based on diffusion and no defects with a convective airflow. In the second case, all 10 elements should have an airflow due to diffusion of 6 ml/min each, and one element should have a defect that causes a convective airflow of 35 ml/min. A diffusion or solubility coefficient ratio of $CO_2$ to air of 41:1 is used as a basis.

As the results summarized below in Table 1 show, in contrast to the prior-art methods in which only the volumetric flow rate of a single gas was measured, the method according to the invention makes it possible to make an unambiguous statement regarding the integrity of filter elements.

TABLE 1

| Method | Case 1 | Case 2 | Difference |
|---|---|---|---|
| Method according to the prior art Limit value: e.g., 10 ml/min per element | | | |
| Air measurement | | | |
| Convective component | — | 35 ml/min | |
| Diffusive component | 10.6 ml/min | 10.6 ml/min | |
| Total | 60 ml/min | 95 ml/min | 3.5 ml/min per element |
| Evaluation (limit value: 100 ml/min) | Tight | leaky ??? | unclear (95% of limit value) |
| Method according to the invention | | | |
| Air measurement | | | |
| Convective component | — | 35 ml/min | |
| Diffusive component | 10.6 ml/min | 10.6 ml/min | |
| Total | 60 ml/min | 95 ml/min | |
| $CO_2$ measurement | | | |
| Convective component | — | 35 ml/min | |
| Diffusive component | 10.6.41 ml/min | 10.6.41 ml/min | |
| Total | 2460 ml/min | 2495 ml/min | |
| $CO_2$/air factor | 41 | 26.3 | 63.9% of theoretical value (41) |
| Evaluation | Tight | Defective | unambiguous |

The ratio of the diffusion coefficients or the solubility coefficients of the gases used in the method according invention in the wetting fluid at the test temperature is at least 30:1. As stated above, a preferred pair of test gases for the method according to the invention is $CO_2$ and air. Another suitable test gas pair is $CO_2$ and nitrogen, since the corresponding physical properties of these gases, particularly the diffusion coefficients or the solubility coefficients in liquids, such as water, also have values that are advantageous for the method according to the invention (ratio of the solubility coefficients at 20° C. in water: $CO_2$ to nitrogen =51.5:1; see D'Ans—Lax, supra, p. 1271). These gases are also inexpensive, non-hazardous and easy to handle. Of course, any combination of gases, e.g., noble gases, such as helium, neon and argon, can be used in the method according to the invention, as long as these gases have the required values regarding the solubility coefficients in the respective wetting liquid and do not adversely affect the filter membranes during measurement.

Preferred wetting liquids for use in the method according to the invention are water, alcohol, product liquids, such as salt solutions (e.g., isotonic sodium chloride solution), buffer solutions (e.g., phosphate buffer), protein-containing (salt) solutions, cell-containing (salt) solutions as well as product liquids in the beverage field, e.g., beer, wine, etc., and mixtures thereof.

The method according to the invention is especially suitable for testing the integrity of large area filter units where the filter element(s) has/have a total membrane area of 0.05 to 90 $m^2$. The method according to the invention can be used for filter areas of any size; the accuracy of the method is established for any filter area. For example, the result of an application-specific correlation (e.g., a defined virus retention value with the maximum allowable convective gas flow) that was determined with a small filter area (e.g., a filter element with an area of 0.05 $m^2$) can be applied to a larger filter area (e.g., more than one filter element up to, for example, 90 $m^2$).

The method according to the invention is suitable, for example, for testing the integrity of cross flow elements as well as filter cartridges that are inserted in corresponding housings. Especially in the testing of the integrity of filter cartridges in corresponding filter housings used for sterile filtration, where it is not possible to purge the clean side, i.e., the filtrate side, because of the sterile filtration, the filter housing must be completely purged on the "unclean" side, i.e., the retentate side of the filter. This is accomplished by pressurizing the unclean side of the filter with a constant test gas pressure to sufficiently stabilize the system to be tested.

When the retentate side of the filter or the filter cartridge is purged, the flow through the corresponding filter housing is sufficient because the outlets at the top and in the bottom of the filter housing are slightly opened.

The individual components of a test apparatus for carrying out the method according to the invention include prior-art or commercially available devices.

Required are pressure sources for two different gases, valves for selecting or adding the respectively required gas and a device for controlling the test pressure and measuring the volumetric gas flow rate.

Preferred devices for controlling the test pressure and measuring the volumetric gas flow rate include, for example, Sartocheck type devices produced by Sartorius AG as well as other commercially available or prior-art devices for regulating and controlling a test pressure in connection with other commercially available or prior art devices for the volumetric measurement of gases, e.g., suspended elements, calorimetric devices or burettes. Furthermore, a suitable test device preferably includes one or more lines with valves for filling the entire system, including the filtrate side, with the respective gas.

Devices for controlling the test pressure and measuring the volumetric gas flow rate, e.g., a device of the Sartocheck series, determine the pressure drop on the membrane side subject to the test pressure (retentate side) of the filter element(s). This pressure drop is a function of the test gas permeating through the pores filled with the wetting liquid, e.g., water. The measured pressure drop is used to determine the volumetric gas flow rate through the filter element(s).

If a burette is used to measure the volumetric gas flow rate, the measurement is taken on the filtrate side of the membrane. On the pressureless membrane side, the gas that permeated through the membrane is quantitatively detected with a liquid-filled burette.

BRIEF DESCRIPTION OF THE DRAWINGS

The invention will be described in further detail hereinafter with reference to the accompanying drawing figures in which.

DETAILED DESCRIPTION OF PREFERRED EMBODIMENTS

Figure 1:
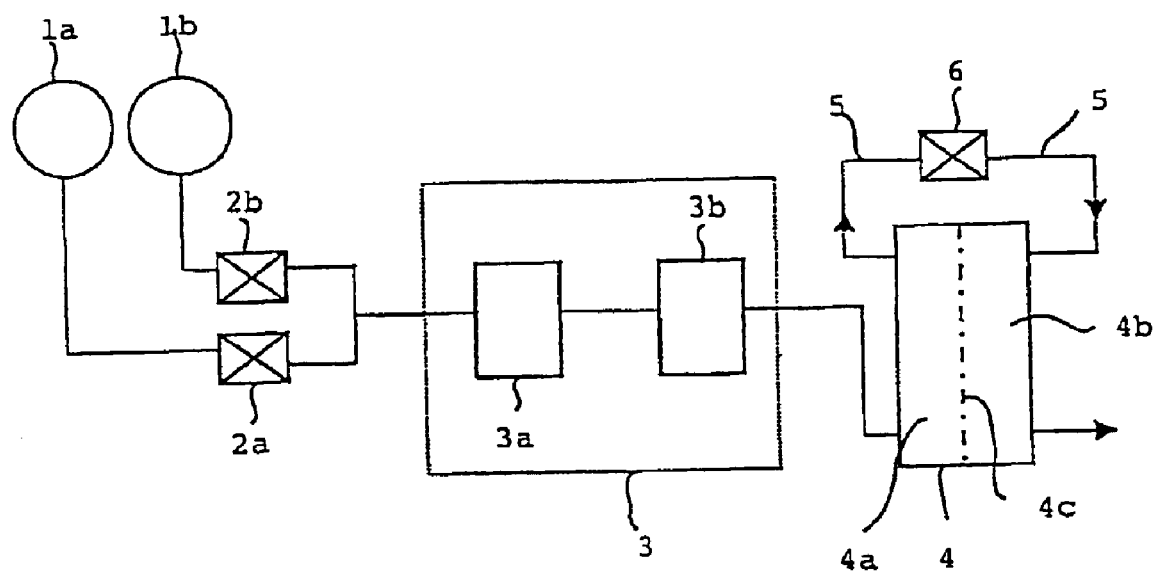
FIG. 1 is a schematic illustration of a test apparatus adapted to carry out the method according to the invention, in which both the device for controlling the test pressure and the device for measuring the volumetric gas flow rate are located on the retentate side of the cross flow filter unit.

In one preferred embodiment, the method according to the invention is carried out by a test apparatus according to FIG. 1. The test gases, e.g., $CO_2$ and air, are supplied to the system, alternately or mixed, from pressure sources (1a, 1b) via corresponding lines equipped with valves (2a, 2b). In the case illustrated in FIG. 1, a device (3) for controlling the pressure (3a) and for measuring the volumetric gas flow rate (3b) is located on the retentate side (4a) of the cross flow filter unit (4) with the filter (4c). The retentate side (4a) and the filtrate side (4b) of the filter unit (4) can be filled with the respective test gas via purging lines (5) equipped with a valve (6).

Figure 2:
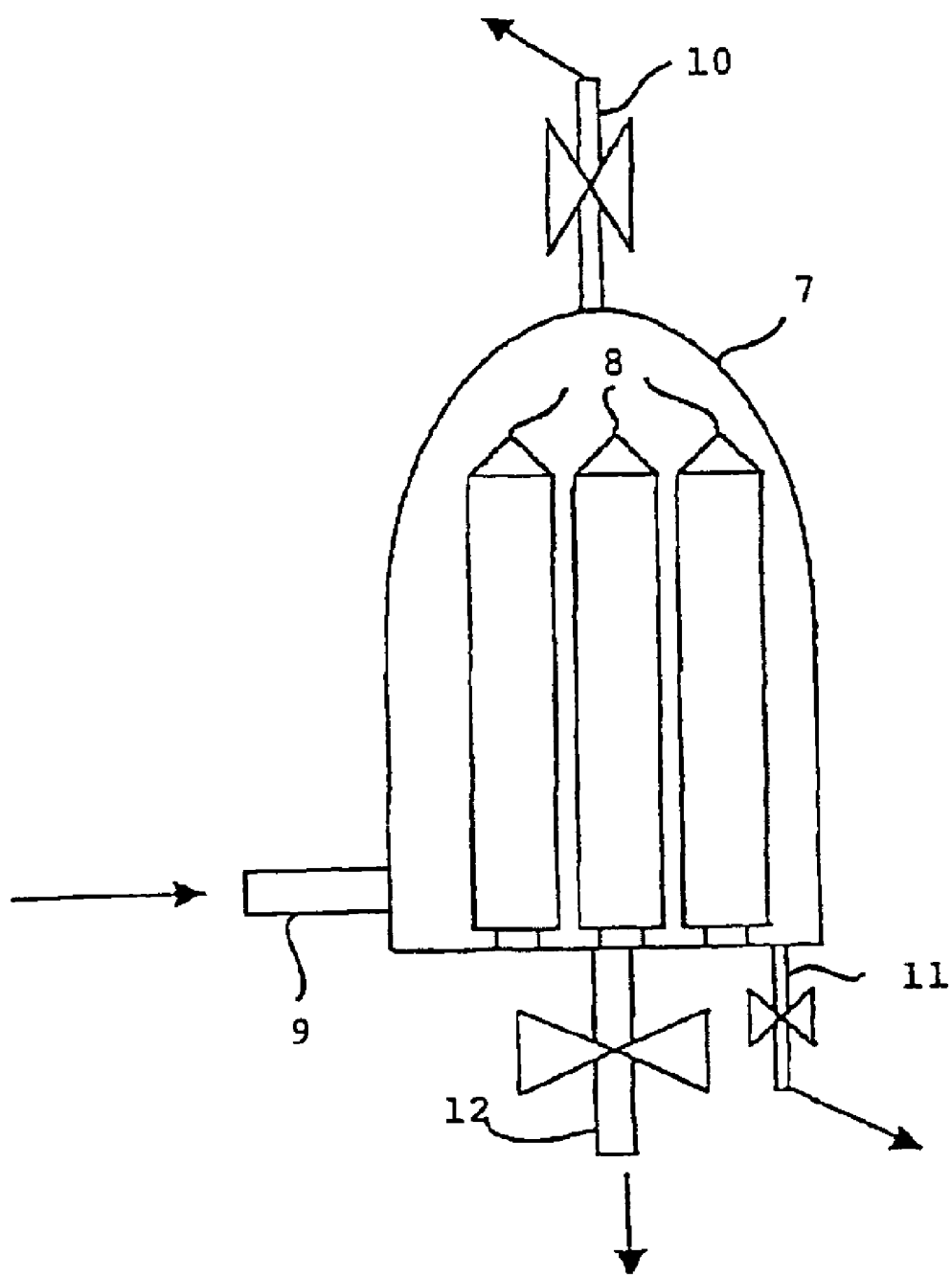
FIG. 2 is a schematic view of a filter housing with filter cartridges installed therein, in which the volumetric gas flow rate is measured with a burette at the housing outlet.

In another embodiment of a test apparatus for carrying out the method of the invention (FIG. 2), one or more filter cartridges (8) are arranged in a filter housing (7). The respective test gas is supplied to the filter housing (7) via a housing inlet (9). The retentate side of the filter cartridges (8) is purged completely by slightly opening the upper vent cock (10) and the vent on the housing floor (11). The volumetric gas flow rate through the filter cartridges (8) is measured using a burette which is connected at the housing inlet (12) and which quantitatively detects the gas which passes through the membrane of the filter cartridges (8).

Figure 3:
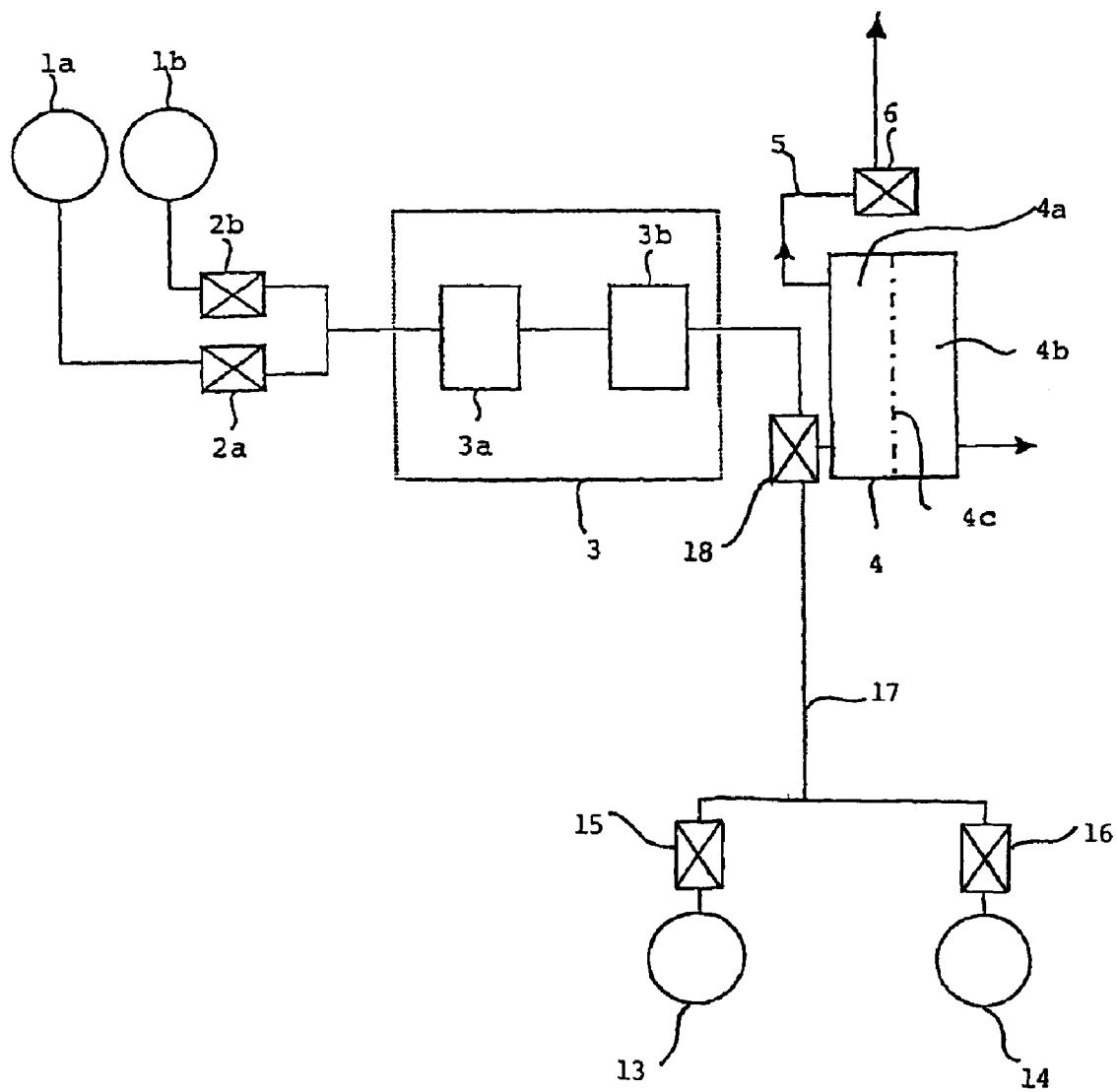
FIG. 3 is a schematic illustration of a test apparatus adapted to carry out the method of the invention for dead end filter units, in which two wetting fluids are used.

In yet another preferred embodiment the method according to the invention is carried out using a test apparatus as illustrated in FIG. 3. The test gas, e.g., air, is supplied to the system from a pressure source (1a) via a corresponding line with a valve (2a). In the case illustrated in FIG. 3, a device (3) for controlling the pressure (3a) and measuring the volumetric gas flow rate (3b) is located on the inflow side (4a) of the dead end filter unit (4) with the filter (4c). The inflow side (retentate side) (4a) of the filter unit (4) can be purged or filled with the test gas via a purging line (5) equipped with a valve (6). To introduce wetting liquids (13, 14) into the filter unit (4), the tanks with the respective wetting liquid (13, 14) are connected with the inlet of the dead end filter unit (4) via valves (15, 16) and a line (17) and via an additional three-way valve (18).

EXAMPLE 1

The method according to the invention was carried out by means of diffusion measurements at a test pressure of 1 bar using four separate Sartocon-II cassettes made by Sartorius AG. The membrane of cassette No. 4 was mechanically damaged. The test gases used were air and $CO_2$. Furthermore, the same measurements were simultaneously made with three intact cassettes (No. 1–3), again with air and $CO_2$. Finally, the method was simultaneously carried out using two intact (No. 1 and No. 2) and one intentionally damaged cassette (No. 4) under the same test conditions, again using air and $CO_2$ as test gases. The device used to control the pressure and to determine the gas volume was a Sartocheck-3-EPS type device (Sartorius AG). The filter cassettes were cross flow units of the type 3021442906E-SG (Sartorius AG). Each filter cassette had a total membrane area of 0.6 $m^2$.

The measuring parameters are given in Table 2. The measuring time differs because the optimal operating range of the measuring instrument used (Sartocheck-3-EPS) has to be selected. Due to the strong diffusion of $CO_2$ a strong pressure drop occurs on the retentate side of the filter unit(s), so that a shorter test time was selected. In contrast, the pressure drop for air under the given conditions is much smaller, so that a longer test time is required.

In this example, a limit value was determined for the maximum allowable gas flow (using air as the test gas) by means of protein retention for the module type 3021442906E-SG. The protein retention value to be achieved was set at >99.99%. The correlation showed that the maximum allowable gas flow of air at this protein retention value at a test pressure of 1bar in this example is 5 ml/min.

TABLE 2

| Gas | Air | $CO_2$ |
|---|---|---|
| Stabilization time | 5 min | 5 min |
| Test time | 10 min | 3 min |
| Test pressure | 1 bar | 1 bar |
| Temperature | 20° C. | 20° C. |
| Limit value | 5 ml/min | — |

Table 3 shows the measurement results.

TABLE 3

| Cassette No. | Diffusion Measurement with Air ml/min | Diffusion Measurement with $CO_2$ ml/min | $CO_2$/Air Ratio |
|---|---|---|---|
| 1 | 0.9 | 26 | 28.89:1 |
| 2 | 0.8 | 26.5 | 33.13:1 |
| 3 | 0.6 | 21.3 | 35.50:1 |
| 4 | 11.7 | 57 | 4.98:1 |
| 1, 2, 3 | 2.3 | 71.2 | 30.96:1 |
| 1, 2, 4 | 14.7 | 84.5 | 5.75:1 |

It was found that when measuring two intact filter units and one damaged unit, the ratio of the volumetric gas flow rates of $CO_2$/air strongly deviates from the ratio that is determined when three intact filter units are measured.

EXAMPLE 2

The method according to the invention was carried out with three separate Sartorius AG Sartocon-II cassettes by means of diffusion measurements at a test pressure of 0.5 bar. The membrane of cassette No. 3 was mechanically damaged. The test gas used was air and the wetting liquids were ethanol (96%) and water. The same measurements were conducted simultaneously with two intact cassettes (No. 1–2), again using ethanol (96%) and water. The method was then carried out simultaneously with one intact cassette (No. 2) and one deliberately damaged cassette (No. 3) under the same test conditions, again using ethanol (96%) and water as wetting liquids. Finally, the method was carried out simultaneously with two intact cassettes (Nos. 1 and 2) and one deliberately damaged cassette (No. 3) under the same test conditions, again using ethanol (96%) and water as wetting liquids. The device used to control the pressure and to determine the gas volume was a Sartocheck-3-EPS type device (Sartorius AG). The filter cassettes were cross flow units of the type 01030070,029 (No. 1), 01030070,030 (No. 2) and 01020040,034 (No. 3) (Sartorius AG). Each filter cassette had a total membrane area of 0.6 m².

The measuring parameters are given in Table 4.

TABLE 4

| Wetting liquid | Ethanol (96%) | Water |
|---|---|---|
| Stabilization time | 5 min | 5 min |
| Test time | 5 min | 5 min |
| Test pressure | 0.5 bar | 0.5 bar |
| Temperature | 20° C. | 20° C. |
| Limit value with test gas air | 25 ml/min | 3 ml/min |

Table 5 shows the measurement results.

TABLE 5

| Cassette No. | Diffusion Measurement with Air in Ethanol (96%) ml/min | Diffusion Measurement with Air in Water ml/min | Ethanol/Water Ratio |
|---|---|---|---|
| 1 (intact) | 19.4 | 1.9 | 10.21:1 |
| 2 (intact) | 18.1 | 1.4 | 12.93:1 |
| 3 (defective) | 37.2 | 13.8 | 2.7:1 |
| 1, 2 (intact) | 36.8 | 3.1 | 11.87:1 |
| 2, 3 (defective) | 56.1 | 14.8 | 3.79:1 |
| 1, 2, 3 (defective) | 78.4 | 15 | 5.23:1 |

It was found that if a damaged (i.e., leaking) filter unit, or intact filter units combined with damaged filter units were measured, the ratio of the volumetric gas flow rates in ethanol (96%)/water strongly deviated from the ratio determined if individual intact filter units, or if two intact filter units were tested.

These examples effectively demonstrate the reliability of the method according to the invention, especially in testing the integrity of filter units with large total membrane areas.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method for testing the integrity of at least one filter element arranged in a device, said method comprising:
   (a) filling pores of the filter material of the at least one filter element in the device with a wetting liquid,
   (b) purging at least the retentate side of the at least one filter element in the device with a first gas,
   (c) pressurizing the at least one filter element with the first gas under a test pressure and at a test temperature,
   (d) measuring the volumetric flow rate of the first gas through the at least one filter element at the test pressure,
   (e) degassing the device,
   (f) repeating steps (b) to (d) with a second gas,
   (g) determining the ratio of the volumetric gas flow rates,
   (h) determining the ratio of the solubility or diffusion coefficients of the gases in the wetting liquid at the test temperature, and
   (i) determining a convective component of the volumetric gas flow rate, wherein the ratio of the solubility or diffusion coefficients of the first and second gases in the wetting liquid at the test temperature is at least 1.25:1 and the viscosities of the gases at the test temperature do not differ by more than 50%.

2. A method according to claim 1, wherein the convective component of the volumetric gas flow rate is determined by calculating the volumetric gas flow rate due to convection through the at least one filter element.

3. A method according to claim 1, wherein the convective component of the volumetric gas flow rate is determined by comparing the ratio of the volumetric gas flow rates with the ratio of the diffusion coefficients.

4. A method according to claim 1, wherein a maximum allowable convective component of the volumetric gas flow rate is determined by correlation to an independent retention test.

5. A method according to claim 4, wherein the retention test is a protein retention test, a virus retention test, or a bacteria challenge test.

6. A method according to claim 1, wherein a plurality of like filter units are arranged in the device, and the determination of the ratio of the solubility or diffusion coefficients of the two gases in the wetting liquid in step (h) comprises measuring the volumetric flow rates in a single filter element of the same type which is known not to have defects or excessively large pores which would enable a convective gas flow to occur.

7. A method according to claim 1, wherein steps (c) and (d) for the first and second gases are carried out at a plurality of test pressures.

8. A method according to claim 1, wherein the ratio of the diffusion coefficients of the two test gases at the test temperature is at least 30:1.

9. A method according to claim 1, wherein the first gas is $CO_2$ and the second gas is air or nitrogen.

10. A method according to claim 1, wherein the at least one filter element has a total membrane area of 0.05 to 90 $m^2$.

11. A method for testing the integrity of at least one filter element arranged in a device, said method comprising:
(a) filling pores of the filter material of the at least one filter element in the device with a first wetting liquid,
(b) purging at least the retentate side of the at least one filter element in the device with a test gas,
(c) pressurizing the at least one filter element with the test gas under a test pressure and at a test temperature,
(d) measuring the volumetric flow rate of the test gas through the at least one filter element at the test pressure,
(e) degassing the device,
(f) replacing the first wetting liquid in the pores of the filter material of the at least one filter element in the device with a second wetting liquid,
(g) repeating steps (b) to (e) with the second wetting liquid,
(h) determining the ratio of the volumetric gas flow rates,
(i) determining the ratio of the solubility or diffusion coefficients of the test gas in the wetting liquids at the test temperature, and
(j) determining the convective component of the volumetric gas flow rate, wherein the ratio of the solubility or diffusion coefficients of the test gas in the first and the second wetting liquids at the test temperature is at least 1.25:1.

12. A method according to claim 11, wherein the convective component of the volumetric gas flow rate is determined by calculating the volumetric gas flow rate due to convection through the at least one filter element.

13. A method according to claim 11, wherein the convective component of the volumetric gas flow rate is determined by comparing the ratio of the volumetric gas flow rates with the ratio of the diffusion coefficients.

14. A method according to claim 11, wherein a maximum allowable convective component of the volumetric gas flow rate is determined by correlation to an independent retention test.

15. A method according to claim 14, wherein the retention test is a protein retention test, a virus retention test, or a bacteria challenge test.

16. A method according to claim 11, wherein a plurality of like filter units are arranged in the device, and the determination of the ratio of the solubility or diffusion coefficients of the test gas in the two wetting liquids in step (i) comprises measuring the volumetric flow rates in a single filter element of the same type which is known not to have defects or excessively large pores which would enable a convective gas flow to occur.

17. A method according to claim 11, wherein steps (c) and (d) for the first and second wetting liquids are carried out at a plurality of test pressures.

18. A method according to claim 11, wherein the ratio of the diffusion coefficients of the test gas in the two wetting liquids at the test temperature is at least 1.25:1.

19. A method according to claim 11, wherein the first wetting liquid is ethanol and the second wetting liquid is water.

20. A method according to claim 11, wherein the test gas is selected from the group consisting of air, $CO_2$ and nitrogen.

21. A method according to claim 11, wherein the at least one filter element has a total membrane area of 0.05 to 90 $m^2$.

* * * * *